XR 3,421,003

[redacted]

INVENTOR.
Gerald J. Pratt

BY Walter S. Jebrowski
ATTORNEY

3421003
OR IN 250/199

INVENTOR.
Gerald J. Pratt
BY Walter E. Zebrowski
ATTORNEY

United States Patent Office 3,421,003

Patented Jan. 7, 1969

3,421,003

APPARATUS AND METHOD FOR OPTICAL SIGNAL PROCESSING

Gerald J. Pratt, Brooklyn, N.Y., assignor to Corning Glass Works, Corning, N.Y., a corporation of New York Filed Mar. 17, 1965, Ser. No. 440,502

U.S. Cl. 250—199 16 Claims

Int. Cl. H04b *9/00;* G02f *1/24;* G02f *1/28*

ABSTRACT OF THE DISCLOSURE

An optical correlator for providing an output signal which is indicative of a correlation between an electrical signal and a predetermined code sequence. The electrical signal is used to generate an acoustic wave in an isotropic birefringent medium. A beam of collimated circularly polarized light is phase modulated by the acoustic wave in the birefringent medium. The phase modulated light is converted to intensity modulated light by an analyzer which is designed in accordance with the predetermined code. The light output from the analyzer is coupled to a photo detector from which a maximum signal is obtained when the acoustic wave correlates with the code sequence.

The present invention relates to an optical correlator for use in a communications system, and more particularly to an apparatus and method for converting coded elecrical signals containing information into coded light signals, through the intermediary of an ultrasonic delay line, whereafter a facsimile of the original information may be retrieved, despite intervening noise, unwanted signals, and other interference.

Adverse conditions often exist which interfere with the proper and efficient operation of communications and signaling systems. Atmospheric disturbances, jamming, noise, loss of gain, interception and the like are a few examples of such adverse conditions.

Light modulators and other types of optical and electrical devices have been proposed to cope with some of the problems mentioned above. Prior art devices have been unsatisfactory for many reasons including excessive size and weight, inability to process sufficient quantities of signals, poor response, sensititvity to external damage, inadequate discrimination against interference, high cost, and the like.

The present invention is intended to overcome these problems, and to provide improved features and advantages not found in other signal processing devices and methods. Accordingly, it is an object of the present invention to provide an improved means for discriminating between wanted and unwanted signals in a communications system.

Another object of the present invention is to provide signal processing means having high signal gain and low losses.

Still another object of the present invention is to provide a small, light weight, reliable, efficient and economical signal processing system.

A further object of the present invention is to provide an improved transmitter and detector of signals in a communication system.

A still further object of the present invention is to provide a simple, rugged and easily transportable signal processing device.

Still another object of the present invention is to provide a signal processing device having high data rate capability.

These, together with other objects and advantages of the present invention, will be more apparent from the following drawings and detailed description.

Briefly, the present invention is an optical signal processing apparatus comprising a source of collimated, circularly polarized light; an isotropic medium, birefringent when stressed transparent to said light and capable of transmitting ultrasonic stress waves; a source of coded electrical signals; means for converting the signals to ultrasonic stress waves in the medium; a means for converting phase modulated light to intensity modulated light; and a detecting means responsive to intensity modulated light.

Referring to the drawings, FIGURE 1 is an exploded perspective view of an optical correlator according to the invention.

Figure 1:
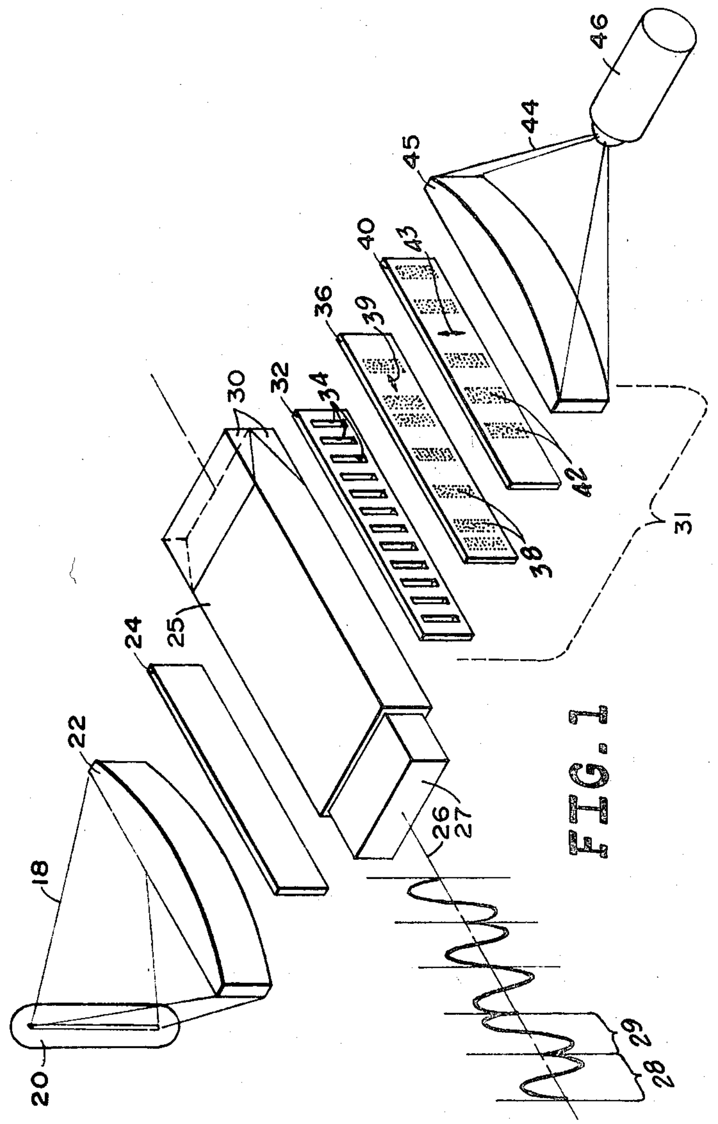

Referring to FIGURE 1, light 18 from source 20 is collimated by lens 22 and transmitted through circular polarizer 24 and delay line 25 in a direction transverse longitudinal axis 26 thereof. Suitable light sources include projection lamps, Burton lamps, collimated light from the sun, coherent light from lasers or optical masers, and the like. Lens 22 may be of the simple plano-convex type having any suitable focal length, several inches being a representative value. The polarizer may be of conventional construction, using a plane polarizer sandwiched together with a quarter-wave plate; or it may be made from specifically prepared film, capable of circularly polarizing light.

Other embodiments of the present invention are envisioned. One such embodiment, for example, is operation in the "crossed out" mode, wherein the previously mentioned quarter wave plate is removed from the system and wherein said light is cross-polarized. In such an embodiment, under no signal conditions, the light output from the system is zero.

The embodiment described herein is known as the "light biased" system wherein some light output exists, even under no signal conditions, as will hereinafter be more completely described.

Delay line 25 is made from a solid, normally isotropic material such as glass, fused silica and the like, chosen for its ability to transmit ultrasonic energy, and also chosen for its birefringence when mechanically stressed. The acoustic properties of the line are suitable to the purpose, depending on such factors as frequency of operation, band width, number of signals carried, velocity of propagation and the like, as may be desired. In fact, the use of a variable delay line is envisioned for applications where variations in signal delay are useful, and code masks of different length are desired.

Electrical signals, having sinusoidal wave forms, for example, arranged in a dual-phase code sequence, are introduced to transducer 27 by suitable conductors, not shown. Signal bits 28 and 29 illustrate bit or dual-phase coding. Each bit contains a complete sinewave and is used to denote a single, discrete bit of information in a sequence. The sinusoidal wave form comprising bit 28 has first positive then negative components, whereas bit 29 contains first negative and then positive components. Bit 28 is called a positive bit, and bit 29, a negative bit. By suitable electrical circuits, positive and negative bits may be caused to follow one another in any desired sequence, unlike normal sinewave propagation. One sequence, for example, may be arranged according to the occurrence of random numbers. Such a sequence would prevent the transmitted information from being decoded by anyone not in possession of the bit code.

In another example, positive bits may be assigned the value "one" of the binary number system and negative bits may represent "zero" in the same system, thus permitting a sequence which represents a specific numeral in the binary system.

Many other such codes and arrangements are possible, and can be used as required.

Experience has shown, however, that a deterioration of system performance may be expected when signal code systems and waveforms other than herein described, are used. By suitable modification of the apparatus, pulsed square waves, saw-tooth waves and the like may be accommodated. It is also possible that the input signal may be frequency modulated, but this would require more extensive modifications, such as changing the width and separation of mask slits, for example, while removing Polaroid films 36 and 40 and polarizer 24.

Transducer 27 converts dual-phase coded electrical signal bits 28 and 29 into shear mode ultrasonic stress waves in the delay line. The transducer may be of any suitable type, although for reasons of efficiency, size and cost, a ceramic lead titanate transducer, operating in the shear mode, is preferred.

Ultrasonic shear waves, traveling through the delay line cause stress, producing a series of compressions and rarefactions in the delay medium. The sequence of compressions and rarefactions has the same dual-phase code as the electrical input signal, each compression-rarefaction representing a positive bit; and each rarefaction-compression representing a negative bit.

Absorber 30, formed preferably of indium or similar materials, damps out ultrasonic shear waves, preventing reflection thereof and prevents generation of spurious signals in the delay line.

Because of the inherent characteristics and design of any delay line, there is a maximum limit to the number of bits containable therein at any instant. For example, if the ultrasonic signal frequency is 10 megacycles per second, each bit has a duration of one tenth of a microsecond. If the delay line provides a ten microsecond delay, then at any instant the maximum number of bits it may contain is 100. It is therefore necessary in the practice of this invention, to limit the number of dual-phase coded bits in any sequence to the maximum number containable by the delay line at any instant. Thus, in the example, sequences of 100 bits or less would be used. Larger or smaller delay lines may of course be utilized to contain almost any desired number of bits, and variable delay lines, as heretofore mentioned, may be utilized to alter bit capacity.

Because of its property of birefringence when stressed, the delay medium changes the phase relationship between components of circularly polarized light passed through it. Since each compression and rarefaction represents a different stress condition in the medium, each area of the medium so stressed will selectively phase modulate the light transmitted through it. When the delay line is completely filled with a dual-phase coded sequence of compressions and rarefactions, a beam of polarized light transmitted transverse thereto will be phase modulated along its width.

Each of the phase modulated portions of the light beam is converted to intensity modulated light beamlets by means of analyzer cell 31 shown in the drawings.

Figure 2:
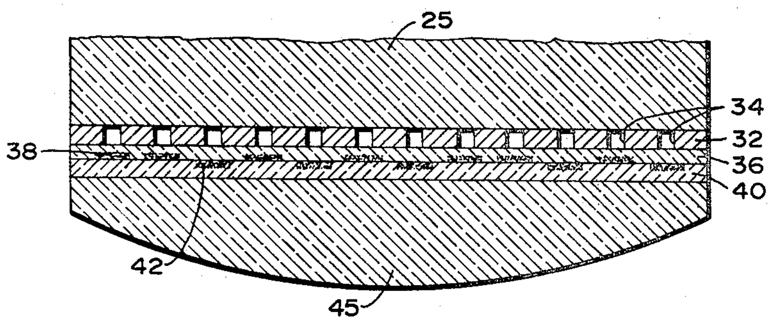
FIGURE 2 is an enlarged sectional view of a portion of an analyzer cell in the optical correlator.

Analyzer cell 31, shown exploded herein and in a fragmentary elevation view in FIGURE 2, comprises apertured mask 32, films 36 and 40, and said mask having a plurality of narrow slits 34. The length and width of the mask correspond with the length and width of the light exit surface of the delay line. The number of slits in the mask is equal to the number of bits containable by the delay line; 100, for example. Each slit is a fraction of a wavelength wide at any design ultrasonic frequency, ⅓ wavelength being representative. For example, in the hypothetical case, each slit would be .005'' wide. Slit centers are spaced one wave length, or approximately .015'', apart. The length of each slit is approximately the same as the thickness of the delay line.

The purpose of the slits in mask 32 is to separate a beam of phase modulated light into a plurality of parallel, phase modulated beamlets, each beamlet corresponding to, and having the phase modulation imparted by a single bit. Any thin, preferably opaque, material may be used for mask 32. Slots are placed therein by any suitable means, preferably as accurately as possible with respect to width and separation.

Although the invention would be operable without mask 32, its use is preferred, permitting more efficient operation by minimizing "cross talk," or stray light effects, between optical portions of the system, and providing higher system gain.

If the coded input to the system is in the form of a frequency modulated signal, then mask 32 may have slits of varying width and spacing, corresponding to said frequency modulation. The mask would then provide correlating function, and the films, as hereinafter described, may be eliminated.

Transparent film 36 has a coded pattern of narrow areas of light polarizing material 38 arranged thereon. Each area has substantially the same size and shape as each of the above mentioned slits, and contains a light polarizing material having an axis of major transmittance oriented parallel to arrow 39.

Film 40 has a similarly coded pattern of light transparent areas 42, each containing a light polarizing material having an axis of major transmittance oriented parallel to arrow 43.

When films 36 and 40 are placed together, or sandwiched, the combination of light transparent areas so formed corresponds to the coded pattern of signal "bits."

In the embodiment of the present invention shown in the figures, separate polarizing films 36 and 40 are used. The film material chosen for its simplicity and suitability is Polaroid Vectograph film, which has polarizable material uniformly deposited on its opposite surfaces, the material on one surface being orthogonally polarizable with respect to the material on the other surface. Either polarization may be given a particular area on the film, by selectively dyeing that area on the appropriate film surface with a special dye which develops the desired polarity. Thus, by treatment of the approriate surfaces, a series of suitably polarized areas incorporating a desired pattern can be produced at will. In the embodiment shown, however, separate films are used to simplify construction. Each film is dyed on only one surface and together, both films produce the desired pattern of orthogonally polarized areas. Quarter wave or three-quarter wave plates may be incorporated in lieu of said films, such plates will perform the correlation function in a manner readily understood by one familiar with the art.

In operation, a prearranged, coded pattern of signal bits is selected, and a corresponding pattern is formed on the polarizing film. At the particular instant in the sequence of transmitted signals when the prearranged pattern of bits exists in the delay line, an instantaneous correlation takes place between that pattern and the film pattern, and a maximum intensity of light is transmitted through each transparent area in the film. At the instant of correlation, beamlets containing light modulated by compressions and rarefactions in the delay medium have polarities which match the polarities of materials within the respective film areas intercepting said beamlets.

The resultant beamlets 44 simultaneously add in phase, and are concentrated by lens 45 and focused on detector 46.

Any other combination of signals, including false signals, noise and the like, produces less light on detector 46, because the modulated beamlets are not correlated with the analyzer pattern, and do not add in phase.

Figure 3:
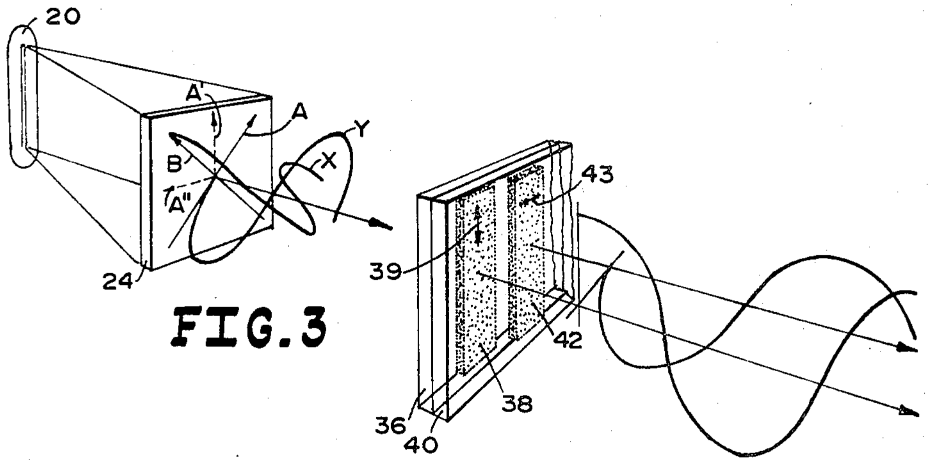
FIGURE 3 is a diagram illustrating the operation of the analyzer cell.
Figure 4:
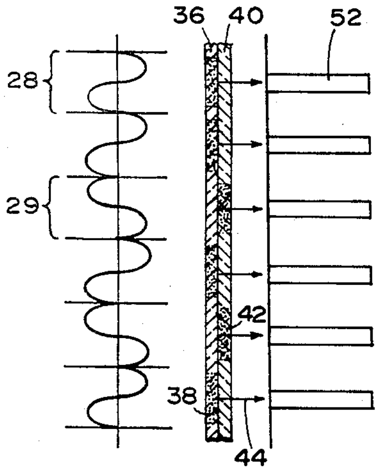
FIGURE 4 is a schematic diagram showing how a coded signal sequence is correlated with a predetermined film code.
Figure 5:
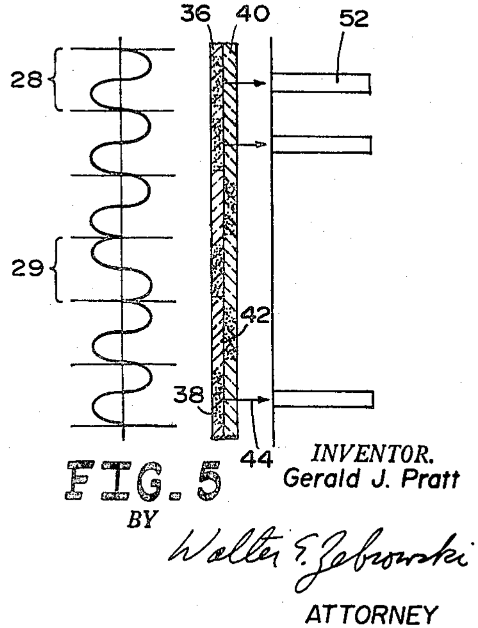
FIGURE 5 is a schematic diagram showing lack of correlation between a random signal sequence and a predetermined film code.

The operation of the present invention, and particularly the function of the analyzer cell, may be better understood by referring to FIGURES 3, 4 and 5.

Referring to FIGURE 3, circular light polarizer 24 separates collimated light into two components X and Y, oriented at right angles to each other and parallel to axes of vibration A and B, respectively, in the plane of the polarizer. In addition, component X is delayed 90° in phase with respect to component Y by means of a quarter wave plate incorporated in the polarizer.

In the absence of a signal input to the delay line an unmodulated light beam containing components X and Y is transmitted through polarizer 24 and films 36 and 40, is partly blocked and partly transmitted by polarized material within areas 38 and 42 of the films, resulting in an attenuation of said unmodulated light. This can best be seen by observing that the axis of major transmittance 39 and 43, of each film respectively, is aligned at approximately 45° to either component X or component Y, neither fully transmitting nor fully extinguishing it.

When a dual-phase code modulated signal passes through the delay line, not shown in this figure, zones of compression and tension are set up in the delay medium, as previously described. When light component X passes through a compression zone, for example, it is delayed with respect to component Y even more than the original 90° mentioned above, as a result of the birefringence of the delay medium when stressed. Assume that component X is now delayed by 135°, for example. The light is no longer circularly polarized, but elliptically polarized, and tending toward plane polarization along new axis A′, which is parallel to axis of major transmittance 39 of film 36. X is thus passed therethrough with little or no attenuation.

Similarly, when rarefaction occurs in the delay medium, component X is advanced in phase with respect to component Y, and the new phase angle may be 45°, for example, between components. Again, the light is elliptically polarized, tending toward plane polarization, and aligned along new axis A′, which is parallel to axis of major transmittance 43 of film 40. X is thus passed therethrough with little or no attenuation.

A plurality of areas 38, having an axis of major transmittance 39, are arranged in film 36 according to a predetermined pattern of spacing so that each of said areas transmits a maximum of light when a corresponding pattern of compression zones in the delay line is in exact alignment therewith. When every area 38 transmits a beamlet of light which has been phase modulated by a compression zone, the total light output from such areas will be at a maximum.

A plurality of areas 42, having an axis of major transmittance 43, are arranged in film 40 according to a predetermined pattern of spacing so that each of said areas transmits a maximum of light when a corresponding pattern of rarefaction zones in the delay line is in exact alignment therewith. When every area 42 transmits a beamlet of light which has been phase modulated by a rarefaction zone, the total light output from such areas will be at a maximum.

The areas 38 and 42 of their respective films are never arranged in coincidence with each other. Thus each area 38 is intended to transmit only light which has been modulated by a compression, and each area 42 is intended to transmit only light which has been modulated by a rarefaction. It can be seen in fact, that compression modulated beamlets having an orientation parallel to A′, for example, will be essentially perpendicular to the axis of major transmittance of all areas 42 in film 40, producing cross polarization and therefore extinction of the light. It is likewise true that all beamlets phase modulated by rarefactions will be blocked by areas 38 in film 36.

The exact correlation necessary for maximum light output will occur between the modulated beamlets and their respective areas in both films instantaneously, only once per sequence of signals, and only when the signal pattern corresponds with the film pattern.

Referring to FIGURE 4, it will be seen that when the signal pattern sequence, comprising positive bits 28 and negative bits 29, is precisely correlated to the appropriate corresponding pattern of areas 38 and 42 of the films, all such areas will contribute in-phase beamlets 44, resulting in light intensity peaks 52.

Referring to FIGURE 5, it will be seen that when no correlation exists between the pattern of a given signal sequence and the pattern of the coded films, only a few beamlets 44 add in phase. All others are blocked by cross polarization between themselves and the areas of the films 36 and 40, and fewer light intensity peaks 52 occur.

Thus, transmitted light intensity will always be greater when correlation occurs than it is at any other time. This correlation principle permits the present invention to be used as a highly selective filter and discriminator against unwanted signals, while at the same time transmitting the wanted signals.

Lens 45 may be another plano-convex type, for example, and detector 46 may be a photoelectric cell such as a photomultiplier tube.

Lenses corrected for aberration will of course produce somewhat better results than uncorrected lenses. For optimum results, it is recommended that corrected lenses be used and that the apparatus be shielded from extraneous light. The position of optical elements in the apparatus should lie along a common axis, and the light source 20 may be moved slightly, during set-up, for best results.

In a typical apparatus constructed according to the present invention:

The transducer is a lead titanate ceramic, series connected unit, 1.8 inches long by .6 inch wide, producing shear waves 10 megacycles per second. The bar of fused silica is .87 inch thick by 1.87 inches wide and 4 inches long, including the absorber wedge, which is one and one sixteenth inches long. The useful window blank thus provided is about 3 inches in length, adeqate to accommodate a 12.7 microsecond, 127 slit mask, 1.88 inches in length.

The light source is rated at 2200 foot candles measured at a distance of one inch from its straight, spring-tensioned .005 inch diameter filament. It has a power of 14.5 watts at an input of 6 volts.

The light detector is a photomultiplier tube, positioned in the system so that all the light produced by the analyzer cell will fall on its cathode.

Large effective lens apertures and proper collimation of the light insure that all of the light will be directed to the cathode of the photo multiplier. An improved system was experimentally constructed wherein corrected lenses of good quality, rather than inexpensive lenses, were used for the collimating and condensing functions. Improved performance was noticed through system gain and signal-to-noise ratio measurements.

It was found desirable to shield the system from ambient light to reduce the noise picked up by the photomultiplier tube. Absence of collimation in the transmitted light results in a deterioration of system performance.

Laboratory measurements indicate that system gain, or signal-to-noise ratio, can be 20 db or better, and that a photoelastic optical correlator has been achieved for data transmission at high rates of speed, despite the presence of extraneous interference.

Although the present invention has been described with respect to specific details of certain embodiments thereof, it is not intended that such details be limitations upon the scope of the invention except insofar as set forth in the following claims.

I claim:

1. An optical signal processing apparatus comprising
(a) a means for providing a polarized beam of light;
(b) a medium, transparent to said light, possessing the property of birefringence when mechanically stressed, said medium having a longitudinal axis;
(c) means for directing said polarized beam of light through said medium in a direction transverse said longitudinal axis;
(d) a source of modulated electrical signals;
(e) a means for converting said electrical signals into mechanical signals for transmission through said medium in a direction parallel to the longitudinal axis thereof, in order to phase modulate said beam of light in accordance with a pattern corresponding to said electrical signals;
(f) an analyzer for converting phase modulated light into intensity modulated light, said analyzer comprising a mask having a plurality of slits therein, the spacing between slits being one wavelength of the mechanical signal traveling in said medium; and a plurality of light transmitting areas aligned with said slits, said areas containing material capable of transmitting beamlets of polarized light having a specific polarization orientation; and
(g) a detecting means responsive to intensity modulated light.

2. An optical correlator comprising:
a means for providing a beam of light;
means for polarizing said beam of light;
a solid isotropic medium having a longitudinal axis, said medium being:
birefringent when mechanically stressed and transparent to said beam of light transmitted therethrough, transverse the longitudinal axis thereof;
a transducer for converting coded electrical signals into coded ultrasonic stress waves for transmission through said medium in a direction substantially parallel the longitudinal axis thereof, said stress waves producing birefringence in said medium in accordance with said coded signals, said birefringence causing phase modulation of said polarized light;
a means for preventing reflection of said ultrasonic stress waves within said medium;
an analyzer for converting phase modulated light into intensity modulated light, said analyzer including:
light polarizable material having a plurality of closely spaced, parallel segments defining a plurality of narrow light transmitting areas, each of said areas containing material capable of transmitting beamlets of polarized light having a specific orientation,
said areas being further disposed in said material in such a prearranged pattern as to intercept only certain of said beamlets; and
a light detecting means responsive to light intensity.

3. The optical correlator of claim 2 wherein said means to polarize said beam of light consists of cross polarizer.

4. The optical correlator of claim 2 wherein said means to polarize said beam of light consists of circular polarizer.

5. The optical correlator of claim 2 wherein said means to polarize said beam of light consists of elliptical polarizer.

6. The optical correlator of claim 4 wherein said analyzer comprises an apertured mask for separating said beam of light into a plurality of beamlets all of the apertures in said apertured mask having the same optical density.

7. The optical correlator of claim 4 in which said isotropic medium is made from fused silica.

8. The optical correlator of claim 2 in which said isotropic medium is an ultrasonic energy transmitting portion of an ultrasonic delay line made from fused silica.

9. The optical correlator of claim 2 in which said means for preventing reflection of said ultrasonic stress waves are an ultrasonic wave absorber made from indium.

10. The optical correlator of claim 2 in which said light detector comprises a photo-electric cell.

11. A method of optical signal processing comprising the steps of:
(a) providing a beam of collimated, circularly polarized light;
(b) transmitting said beam through an isotropic medium having a longitudinal axis, in a direction transverse said longitudinal axis, said medium being transparent to said light and birfringent when mechanically stressed;
(c) converting coded electrical signals to ultrasonic stress waves in said isotropic medium;
(d) transmitting said stress waves unidirectionally through said medium, parallel to said longitudinal axis thereof, to produce areas of birefringence therein, corresponding to said coded signals;
(e) absorbing said ultrasonic stress waves after one transit of said medium, to prevent reflection therein;
(f) modulating said light, in accordance with said coded signals, while said light is passing through said isotropic medium;
(g) passing said phase modulated light through an analyzer comprising at least one polarizing film having a pattern of orthogonally polarized light transmitting areas arranged therein, wherein said phase modulated light is transformed into intensity modulated beamlets of light by selective transmittance through said areas; and
(h) focusing said intensity modulated light from each beamlet on an intensity responsive light detector.

12. The method of claim 10 wherein said ultrasonic stress waves are shear mode ultrasonic stress waves.

13. The method of claim 10 comprising a step of separating said phase modulated light into a plurality of beamlets by means of an apertured mask.

14. An optical signal processing apparatus comprising:
means for providing a beam of light;
means for polarizing said beam of light;
a medium, transparent to said light, possessing the property of birefringence when mechanically stressed, said medium having a longitudinal axis;
means for directing said polarized beam of light through said medium in a direction transverse said longitudinal axis;
a transducer for converting coded electrical signals into coded ultrasonic stress waves for transmission through said medium in a direction substantially parallel to the longitudinal axis thereof, said stress waves producing birefringence in said medium in accordance with said coded signals, said birefringence causing phase modulation of said polarized light;
a mask having a plurality of equally spaced slits therein, said mask being situated to receive said phase modulated light and separate the same into a plurality of beamlets;
a plurality of light polarizers, one being located adjacent each of said slits, preselected ones of said polarized in a first direction, the remaining polarizers being polarized in a direction orthogonal to said first direction; and
detecting means responsive to the light passing through said plurality of light polarizers.

15. The optical correlator of claim 14 wherein the slits in said mask are less than a wavelength wide and the spacing between adjacent slits is equal to one wavelength, the wavelength being that of the ultrasonic stress waves in said medium.

16. The optical correlator of claim 14 in which said light detector comprises a photo-electric cell.

(References on following page)

References Cited

UNITED STATES PATENTS

| | | | |
|---|---|---|---|
| 2,622,470 | 12/1952 | Rines | 350—149 |
| 3,111,666 | 11/1963 | Wilmotte | 350—149 |
| 3,189,746 | 6/1965 | Slobodin et al. | 350—161 |
| 3,227,034 | 1/1966 | Shelton | 350—149 |

RODNEY D. BENNETT, *Primary Examiner.*

C. E. WANDS, *Assistant Examiner.*

U.S. Cl. X.R.

350—149, 161

UNITED STATES PATENT OFFICE

CERTIFICATE OF CORRECTION

Patent No. 3,421,003 January 7, 1969

Gerald J. Pratt

It is certified that error appears in the above identified patent and that said Letters Patent are hereby corrected as shown below:

Column 4, line 25, after "provide" insert -- the --. Colu 6, line 41, after "waves" insert -- at --. Column 8, line 13, "birfringent" should read -- birefringent --; line 61, after "said" insert -- polarizers being --.

Signed and sealed this 17th day of March 1970.

(SEAL)
Attest:

Edward M. Fletcher, Jr.
Attesting Officer

WILLIAM E. SCHUYLER, JR.
Commissioner of Patents